(12) United States Patent
Matejka et al.

(10) Patent No.: US 11,663,358 B2
(45) Date of Patent: May 30, 2023

(54) PERTURBATION-BASED TECHNIQUES FOR ANONYMIZING DATASETS

(71) Applicant: AUTODESK, INC., San Francisco, CA (US)

(72) Inventors: Justin Frank Matejka, Newmarket (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 1005 days.

(21) Appl. No.: 15/972,085

(22) Filed: May 4, 2018

(65) Prior Publication Data

US 2018/0322309 A1    Nov. 8, 2018

Related U.S. Application Data (60) Provisional application No. 62/503,087, filed on May 8, 2017.

(51) Int. Cl.
| | |
|---|---|
| G06F 21/62 | (2013.01) |
| G06F 17/18 | (2006.01) |
| G06F 16/2458 | (2019.01) |
| G09C 5/00 | (2006.01) |
| G06F 18/22 | (2023.01) |

(52) U.S. Cl.
CPC ...... *G06F 21/6254* (2013.01); *G06F 16/2462* (2019.01); *G06F 17/18* (2013.01); *G06F 18/22* (2023.01); *G09C 5/00* (2013.01); *H04L 2209/88* (2013.01)

(58) Field of Classification Search
CPC ......... G06F 21/62; G06F 7/00; G06F 21/6254
USPC ....................................................... 707/758
See application file for complete search history.

(56) References Cited

U.S. PATENT DOCUMENTS

| | | | |
|---|---|---|---|
| 9,734,148 B2 * | 8/2017 | Bendersky | G06Q 30/0254 |
| 10,402,590 B2 * | 9/2019 | Rai | G06Q 20/0425 |

(Continued)

OTHER PUBLICATIONS

Anscombe, F.J., "Graphs in Statistical Analysis" URL: http://links.jstor.org/sici?sici=0003-1305%28197302%2927%3A1%3C17%3AGISA%3E2.0.CO%3B2-J, The American Statistician vol. 27, No. 1, Feb. 1973, pp. 17-21.

(Continued)

*Primary Examiner* — Giovanna B Colan
(74) *Attorney, Agent, or Firm* — Artegis Law Group, LLP (57) ABSTRACT

In various embodiments, a dataset generation application generates a new dataset based on an original dataset. The dataset generation engine perturbs a first data item included in the original dataset to generate a second data item. The dataset generation application then generates a test dataset based on the original dataset and the second data item. The test dataset includes the second data item instead of the first data item. Subsequently, the dataset generation application determines that the test dataset is characterized by a first property value that is substantially similar to a second property value that characterizes the original dataset. The first property value and the second property value are associated with the same property. Finally, the dataset generation application generates a new dataset based on the test dataset. The new dataset conveys aspect(s) of the original dataset without revealing the first data item.

20 Claims, 5 Drawing Sheets

(56) References Cited

U.S. PATENT DOCUMENTS

| | | | | |
|---|---|---|---|---|
| 2005/0138110 | A1* | 6/2005 | Redlich | G06F 21/6254 709/201 |
| 2007/0130106 | A1* | 6/2007 | Gadiraju | G06F 21/6218 |
| 2007/0233711 | A1* | 10/2007 | Aggarwal | G06F 16/2465 |
| 2008/0301805 | A1* | 12/2008 | Bharara | G16H 30/20 726/21 |
| 2012/0259877 | A1* | 10/2012 | Raghunathan | G06F 21/6254 707/757 |
| 2013/0198194 | A1* | 8/2013 | Chen | G06F 21/6254 707/E17.089 |
| 2014/0380489 | A1* | 12/2014 | Hacid | G06F 21/6254 726/26 |
| 2015/0169895 | A1* | 6/2015 | Gkoulalas-Divanis | G06F 21/6227 726/26 |
| 2016/0034706 | A1* | 2/2016 | Munakata | G06F 16/2365 726/28 |
| 2017/0124336 | A1* | 5/2017 | Freudiger | G06F 16/22 |
| 2018/0276411 | A1* | 9/2018 | Abdul | G06F 21/6254 |

OTHER PUBLICATIONS

Bach et al., Interactive Random Graph Generation with Evolutionary Algorithms. SpringerLink, 2013, 541-552.

Blyth, C.R., "On Simpson's Paradox and the Sure-Thing Principle", Journal of the American Statistical Association, vol. 67, No. 338, Jun. 1972, pp. 364-366.

Cairo, A. "Download the Datasaurus: Never trust summary statistics alone; always visualize your data" http://www.thefunctionalart.com/2016/08/download-datasaurus-never-trust-summary.html, Aug. 29, 2016, 3 pages.

Chatterjee, S. "Generating Data with Identical Statistics but Dissimilar Graphics", The American Statistician vol. 61, No. 3, Aug. 2007, pp. 248-254.

Fung et al., "Privacy-preserving Data Publishing: A Survey of Recent Developments", ACM Computing Surveys, vol. 42, No. 4, Article 14, Jun. 2010, pp. 14:1-14:53.

Govindaraju et al., "Illustration of regression towards the means", International Journal of Mathematical Education in Science and Technology vo. 39, No. 4, 2008, pp. 544-550.

Haslett et al., Cloning Data: Generating Datasets with Exactly the Same Multiple Linear Regression Fit, Australian & New Zealand Journal of Statistics vol. 51, No. 4, 2009, pp. 499-503.

Hwang, C.-R., Review of the book "Simulated Annealing: Theory and Applications" by P.J.M. van Laarhoven et al., Acta Applicandae Mathematicae 12, 1, 1988, pp. 108-111.

Simpson, E.H., "The Interpretation of Interaction in Contingency Tables", Journal of the Royal Statistical Society. Series B (Methodological) vol. 13, No. 2, 1951, pp. 238-241.

Stefanski, L.A. "Residual (Sur)Realism", The American Statistician, vol. 61, No. 2, May 2007, 16 pages.

Wickham et al., "Graphical inference for infovis", IEEE Transactions on Visualization and Computer Graphics vol. 16, No. 6, 2010, pp. 973-979.

* cited by examiner

PERTURBATION-BASED TECHNIQUES FOR ANONYMIZING DATASETS

CROSS-REFERENCE TO RELATED APPLICATIONS

This application claims priority benefit of the U.S. Provisional Patent Application titled, "GENERATING DATA SETS WITH VARIED APPEARANCE AND IDENTICAL STATISTICS THROUGH SIMULATED ANNEALING," filed on May 8, 2017 and having Ser. No. 62/503,087. The subject matter of this related application is hereby incorporated herein by reference.

BACKGROUND

Field of the Various Embodiments

Embodiments of the present invention relate generally to data anonymization and, more specifically, to perturbation-based techniques for anonymizing datasets.

Description of the Related Art

Many types of datasets include data items that are confidential in additional to data items that are non-confidential. Oftentimes, to protect the privacy of the confidential data items included in a dataset, while enabling effective analysis of non-confidential aspects of the dataset, data anonymization operations are performed on the dataset. In many implementations, those operations usually involve a masking application that masks (e.g., obscures or removes) the confidential data items included in the dataset. while leaving the non-confidential data items unaltered.

One limitation of masking applications is that the data items that are masked can sometimes be reconstructed using the non-masked data items remaining in the dataset and data items available in public datasets. For example, a medical dataset could include information regarding numerous patients. For each patient, the dataset could include the patient's name, social security number, address, current medications, blood pressure readings, pulse rate readings, etc. To protect the privacy of the patients, a masking application could remove any personally-identifying data items from the dataset, such as the names, social security numbers, and addresses of the various patients. However, the dataset could still include information about each patient that could be used to piece-together those personally-identifying data items. For example, for a visit to an emergency room for possible food poisoning, the dataset could include a particular patient's arrival time, the distance the patient traveled to the hospital, the times and places of the patient's recent restaurant meals, etc. Using these activity-related data items in conjunction with restaurant datasets and navigation datasets, a third party could determine the address and name of the particular patient.

Another limitation of masking applications is that typical masking applications do not comprehensively anonymize datasets. More specifically, each masking application is usually fine-tuned to mask a particular type of data items and does not mask any other types of data items. However, sometimes all of the data items included in a dataset may be confidential. For example, all of the data items included in a dataset representing a given medical trial could be confidential. Consequently, a corresponding masked dataset generated by a masking application could not be released without compromising the confidentiality of the dataset. In another example, a dataset could be a design file in which all the data items are confidential. The client company that owns the design file could be unwilling to disclose any of the confidential data items to a computer-automated design (CAD) company that provides a CAD tool. Accordingly, efforts by the CAD company to debug a problem that is observed when the client company executes the CAD tool on the design file could be hindered by an inability of the CAD company to replicate the problem.

As the foregoing illustrates, what is needed in the art are more effective techniques for anonymizing datasets.

SUMMARY

One embodiment of the present invention sets forth a computer-implemented method for generating a new dataset based on an original dataset. The method includes perturbing a first data item included in the original dataset to generate a second data item; generating a test dataset based on the original dataset and the second data item, where the test dataset includes the second data item instead of the first data item; determining, via a processor, that the test dataset is characterized by a first property value that is substantially similar to a second property value that characterizes the original dataset, wherein both the first property value and the second property value are associated with a first property; and generating the new dataset based on the test dataset, where the new dataset conveys at least one aspect of the original dataset that is associated with the first property without revealing the first data item.

At least one technical advantage of the disclosed techniques relative to prior art is that the disclosed techniques generate new data items instead of masking specific types of data items included in an original dataset. More specifically, the disclosed techniques can be used to generate new non-confidential data items and new confidential data items from an original dataset, where the new confidential data items cannot be effectively reconstructed from the new non-confidential data items. Accordingly, the disclosed techniques can be used to anonymize a wide variety of datasets that could not be effectively anonymized using prior art approaches (e.g., design files, model geometries, etc.). These technical advantages provide a substantial technological advancement over prior art solutions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
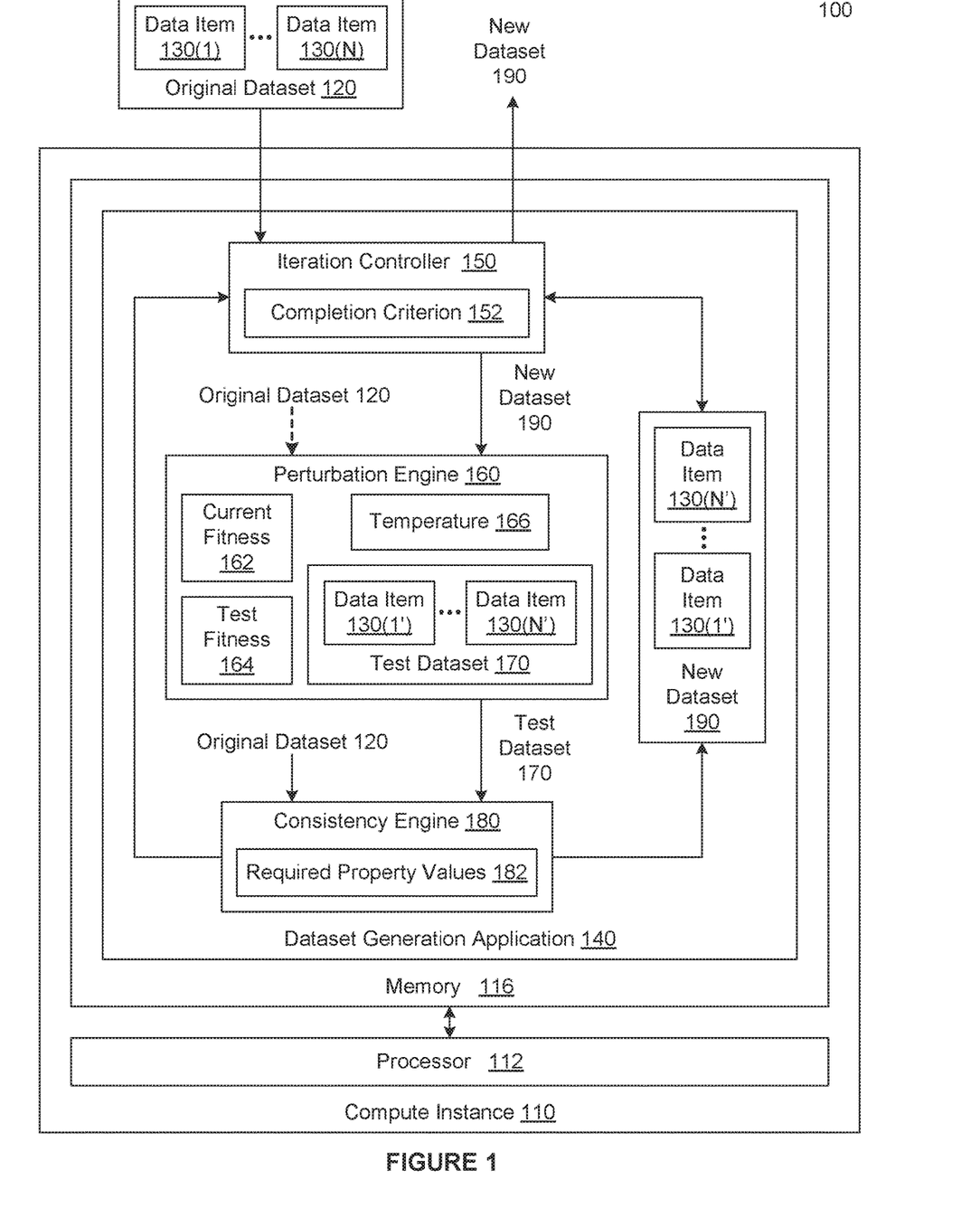
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a compute instance 110. In alternate embodiments, the system 100 may include any number of compute instances 110. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instance 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In some embodiments, the compute instance 110 is configured to perform data anonymization operations on an original dataset 120. In many conventional implementations, those operations usually involve a masking application that masks (e.g., obscures or removes) the confidential data items included in a dataset while leaving the non-confidential data items unaltered.

One limitation of masking applications is that the data items that are masked can sometimes be reconstructed using the non-masked data items remaining in the dataset and data items available in public datasets. For example, a medical dataset could include information regarding numerous patients. For each patient, the dataset could include the patient's name, social security number, address, current medications, blood pressure readings, pulse rate readings, etc. To protect the privacy of the patients, a masking application could remove any personally-identifying data items from the dataset, such as the names, social security numbers, and addresses of the various patients. However, the dataset could still include information about each patient that could be used to piece-together those personally-identifying data items. For example, for a visit to an emergency room for possible food poisoning, the dataset could include a particular patient's arrival time, the distance the patient traveled to the hospital, the times and places of the patient's recent restaurant meals, etc. Using these activity-related data items in conjunction with restaurant datasets and navigation datasets, a third party could determine the address and name of the particular patient.

Another limitation of masking applications is that typical masking applications do not comprehensively anonymize datasets. More specifically, each masking application is usually fine-tuned to mask a particular type of data items and does not mask any other types of data items. However, sometimes all of the data items included in a dataset may be confidential. For example, all of the data items included in a dataset representing a given medical trial could be confidential. Consequently, a corresponding masked dataset generated by a masking application could not be released without compromising the confidentiality of the dataset. In another example, a dataset could be a design file in which all the data items are confidential. The client company that owns the design file could be unwilling to disclose any of the confidential data items to a CAD company that provides a computer-automated design (CAD) tool. Accordingly, efforts by the CAD company to debug a problem that is observed when the client company executes the CAD tool on the design file could be hindered by an inability of the CAD company to replicate the problem.

Generating a New Dataset that Selectively Emulates an Original Dataset

To address the above problems, the system 100 includes, without limitation, a dataset generation application 140. The dataset generation application 140 resides in the memory 116 and executes on the processor 112. Upon acquiring an original dataset 120 that is characterized by any number of required property values 182, the dataset generation application 140 iteratively generates a new dataset 190 that is characterized by property values that are substantially similar to the required property values 182.

As referred to herein, a first property value is "substantially similar" to a second property value if the first property value lies within an acceptable range of the second property value and is associated with the same property as the first property value. The acceptable range may be defined in any technically feasible fashion. For instance, in some embodiments, for each of the required property values 182 that is associated with a statistical property, the acceptable range is defined as the range of values for the statistical property that are within two decimal points of the required property value 182.

As shown, the original dataset 120 includes, without limitation, any number of data items 130. Each of the new dataset 190, the original dataset 120, and a test dataset 170 is a different dataset. As referred to herein, a dataset is any collection of data items 130 organized in any technically feasible fashion. Some examples of datasets include tables of medical information, design files, and model geometries, to name a few. A dataset may be associated with any number of dimensions. For instance, the original dataset 120 may be one-dimensional, two-dimensional, three-dimensional, and so forth.

Each of the data items 130 may include any amount of data (including other data items 130) organized in any technically feasible fashion. Some examples of different data items 130 include, without limitation, a blood pressure reading, a width of a transistor, and a control point in a model geometry. For explanatory purposes only, a data item 130 that is not included in the original dataset 120 is distinguished from a data item 130 that is included in the original dataset 120 with a prime symbol (i.e., '). More precisely, the prime symbol decorates the reference number of each data item 130 that is not included in the original dataset 120.

Each data item 130 may be hierarchical and, as referred to herein, the data items 130 included in a particular dataset include the data items 130 at all hierarchical levels within the dataset. For example, a medical dataset could include any number of "patient" data items 130 describing different patients. Each patient data item 130 could include additional data items 130, such as a "name" data item 130, a "social security number" data item 130, and a "blood pressure reading" data item 130. Accordingly, the medical dataset would include, without limitation, patient data items 130, name data items 130, social security number data items 130, and blood pressure reading data items 130.

Each of the required property values 182 may be any type of value for any characteristic, features, attribute, quality, trait, and so forth, that is associated with the original dataset 120 in any technically feasible fashion. For instance, each of the required property values 182 may be a value for a mathematical property, a statistical property, a visual property, a physical property, an application-specific property, etc. The dataset generation application 140 may acquire the required property values 182 in any technically feasible fashion. For instance, in some embodiments, the iteration controller 150 computes the required property values 182 based on one or more consistency properties and the original dataset 120.

One example of a mathematical property is a height of a model geometry. One example of a statistical property is a mean of blood pressure readings. One example of a visual property is an overall shape of a model geometry. One example of a physical property is whether a model geometry describes a watertight object. One example of an application-specific property is a result, such as an incorrect result or an error condition, of executing a software application on a dataset. Notably, each of the required property values 182 may be a composite value, such as a list, a sequence of words, etc.

The dataset generation application 140 includes, without limitation, an iteration controller 150, a perturbation engine 160, and a consistency engine 180. The iteration controller 150 controls an iteration process that incrementally modifies the new dataset 190. As shown, the iteration controller 150 includes, without limitation, a completion criterion 152. Upon acquiring the original dataset 120, the iteration controller 150 executes initialization operations that set the new dataset 190 equal to the original dataset 120. The iteration controller 150 also performs any initialization operations associated with the completion criterion 152. The iteration controller 150 determines when to stop the iteration process based on the completion criterion 152. The completion criterion 152 may be specified in any technically feasible fashion, and the iteration controller 150 may enforce the completion criterion 152 in any technically feasible fashion.

For instance, in some embodiments, the completion criterion 152 specifies a total number of iterations. Accordingly, the iteration controller 150 initializes an iteration count to one, increments the iteration count for each subsequent iteration, and continues the iteration process until the iteration count is equal to the total number of iterations. In alternate embodiments, the iteration controller 150 may implement any number and type of completion criteria 152 in any technically feasible fashion. For instance, in some alternate embodiments, the completion criteria 152 may specify privacy requirements. In such embodiments, the iteration controller 150 may continue the iteration process until the iteration controller 150 determines that the new dataset 190 complies with the privacy requirements.

In some embodiments, the dataset generation application 140 enables guidance of the new dataset 190 via a fitness metric. In embodiments that implement a fitness metric, the current fitness 162 is the value of the fitness metric for the new dataset 190. In operation, after copying the original dataset 120 to the new dataset 190, the iteration controller 150 initializes the current fitness 162 based on the new dataset 190. Subsequently, as described below, the perturbation engine 160 uses the current fitness 162 to direct the new dataset 190 towards a desired outcome, and the consistency engine 180 updates the current fitness 152.

The dataset generation application 140 may implement any type of fitness metric in any technically feasible fashion. In some embodiments, each of the data items 130 is associated with a different two-dimensional (2D) point, and a "target shape" fitness metric specifies an average distance of the data items 130 included in a dataset to the nearest point in a 2D target shape. Based on the target shape fitness metric, the perturbation engine 160 coerces the new dataset 190 toward the target shape. Some embodiments that implement a target shape fitness metric are described in greater detail in conjunction with FIG. 3. In other embodiments, the dataset generation application 140 may be configured to guide the generation of the new dataset 190 via other types of fitness metric. For instance, in some embodiments, the dataset generation application is configured to reduce a bias associated with the new dataset 190 via a bias fitness metric.

For each iteration, the iteration controller 150 configures the perturbation engine 160 to generate a new test dataset 140 via a dataset perturbation process. As shown, the perturbation engine 160 includes, without limitation, the current fitness 162, a test fitness 164, and a temperature 166. First, the perpetuation engine 160 randomly selects one or more of the data items 130 that are included in the new dataset 190. For each of the selected data items 130, the perpetuation engine 160 adjusts the data item 130($i$) by a relatively small adjustment amount in a random manner to generate a new data item 130($i'$). Subsequently, the perturbation engine 160 generates the new test dataset 170 based on the new dataset 190 and the new data items 130. More specifically, the perturbation engine 160 copies the data items 130 included in the new dataset 190 to the test dataset 170 and then replaces each of selected data items 130($i$) with the corresponding new data item 130($i'$) In alternate embodiments, the perturbation engine 160 may generate the test dataset 170 based on the new dataset 190 and the new data items 130 in any technically feasible fashion.

The perturbation engine 160 may adjust a given data item 130 in any technically feasible fashion that is consistent with the type of the data item 130 and, optionally, the required property values 182. For instance, in some embodiments, a particular data item 130 is a point and each of the required property values 182 is a value for a different statistical property. In such embodiments, the perturbation engine 160 randomly selects the adjustment amount from a normal distribution. The perturbation engine 160 then calibrates the adjustment amount so that at least ninety-five percent of the adjustments result in test datasets 170 characterized by property values that lie within two decimal places of the required property values 182.

In embodiments that implement a fitness metric, the perturbation engine 160 then computes the test fitness 164 based on the fitness metric and the test dataset 170. The test fitness 164 is the value of the fitness metric for the test dataset 170. Subsequently, the perturbation engine 160 performs a comparison operation between the current fitness 162 and the test fitness 164 to determine whether the test dataset 170 represents progress towards the desired outcome associated with the fitness metric. For instance, in some embodiments that implement a target shape fitness metric, if the test fitness 164 is less than the current fitness 162, then the perturbation engine 160 determines that the test dataset 170 represents progress toward the desired outcome. If, however, the test fitness 164 is not less than the current fitness 162, then the perturbation engine 160 determines that the test dataset 170 does not represent progress toward the desired outcome.

If the perturbation engine 160 determines that the test dataset 170 represents progress toward the desired output, then the perturbation engine 160 transmits the test dataset 170 to the consistency engine 180 for further evaluation. In some embodiments, if the perturbation engine 160 determines that the test dataset 170 does not represent progress toward the desired outcome, then the perturbation engine 160 discards the test dataset 170 and repeats the dataset perturbation process to generate a new test dataset 170.

In other embodiments, the perturbation engine 160 implements simulated annealing to determine whether to discard an inferior test dataset 170. As referred to herein, an "inferior" test dataset 170 is a test dataset 170 that does not represent progress toward the desired outcome associated with the fitness metric. As persons skilled in the art will recognize, simulated annealing is a form of optimization that is useful in finding global optima in the presence of large numbers of local optima.

In embodiments that implement simulated annealing, the perturbation engine 160 determines whether to discard an inferior test dataset 170 based on the temperature 166 and a randomly generated number that lies between 0 and 1. If the temperature 166 is less than or equal to the randomly generated number, then the perturbation engine 160 discards the test dataset 170 and repeats the dataset perturbation process to generate a new test dataset 170. Otherwise, the perturbation engine 160 transmits the test dataset 170 to the consistency engine 180 for further evaluation. The perturbation engine 160 may vary the temperature 166 based on any technically feasible cooling schedule. For instance, in some embodiments, the perturbation engine 160 implements a quadratically-smoothed monotonic cooling schedule that starts with the temperature 166 of 0.4 and finishes with the temperature 166 of 0.01.

As shown, the consistency engine 180 includes, without limitation, the required property values 182. Upon receiving the test dataset 170, the consistency engine 180 determines whether the test dataset 170 is characterized by property values that are substantially similar to the required property values 182. The consistency engine 180 may determine whether the test dataset 170 is characterized by property values that are substantially similar to the required property values 182 in any technically feasible fashion.

For instance, in some embodiments, for each of the required property values 182, the consistency engine 180 computes the corresponding test property value. The test property value corresponding to a given required property value 182 is the value of the property associated with the required property value 182 for the test dataset 170. The consistency engine 180 may compute the test property values in any technically feasible fashion. The consistency engine 180 then determines whether the each of the test property values lies within the range associated with the corresponding required property value 182. If each of the test property values lies within the range associated with the corresponding required property value 182, then the consistency engine 180 determines that the test dataset 170 is characterized by property values that are substantially similar to the required property values 182. Otherwise, the consistency engine 180 determines that the test dataset 170 is not characterized by property values that are substantially similar to the required property values 182.

If the consistency engine 180 determines that the test dataset 170 is characterized by property values that are substantially similar to the required property values 182, then the consistency engine 180 sets the new dataset 190 equal to the test dataset 170. Further, the consistency engine 180 sets the current fitness 162 equal to the test fitness 164. If, however, the consistency engine 180 determines that the test dataset 170 is not characterized by property values that are substantially similar to the required property values 182, then the consistency engine 180 changes neither the new dataset 190 nor the current fitness 162.

After the consistency engine 130 has evaluated and, optionally, processed the test dataset 170, the iteration controller 150 determines whether to stop the iterations based on the completion criterion 152. For instance, in embodiments in which the completion criterion 152 specify a total number of iterations, the iteration controller 150 may increment the iteration count and then compare the iteration count to the total number of iterations. In general, if the iteration controller 150 determines to continue the iterations, then the iteration controller 150 configures the perturbation engine 160 to generate a new test dataset 170. If, however, the iteration controller 150 determines to stop the iterations, then the iteration controller stores the new dataset 190 and ceases to operate.

Advantageously, despite including different data items 130 than the original dataset 190, the new dataset 190 is characterized by property values that are substantially similar to the required property values 162. Consequently, the new dataset 190 may be used in lieu of the original dataset 120 to explore aspects of the original dataset 120 related to the required property values 182 without disclosing the data items 130 included in the original data set 120.

For instance, in some embodiments, the original dataset 120 may be a design file that is associated with a bug in a CAD tool. To enable debugging of the CAD tool without disclosing any proprietary information, the consistency engine 180 may be configured to generate the new dataset 190 that is characterized by the required property value 182 of reproducing the bug in the CAD tool.

As persons skilled in the art will recognize, the dataset generation application 140 may be configured to generate new datasets 190 for a wide range of original datasets 120 and for a variety of purposes. In some embodiments, as described in detail in conjunction with FIGS. 2A-2C, the dataset generation application 140 may be configured to perform data anonymization on the original dataset 120 based on any number and type of required property values 182. In other embodiments, as described in detail in conjunction with FIG. 3, the dataset generation application 140 may be configured to generate new datasets 190 that illustrate the importance of graphical representations when exploring data items 130.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. For instance, in alternate embodiments, the perturbation engine 160 ensures that the test dataset 120 is characterized by property values that are substantially similar to the required property values 182 prior to computing the test fitness 162, and the consistency engine 180 is omitted from the system 100. In the same or other embodiments, the current fitness 162 may be replaced by an original fitness that is the value of the fitness metric for the current dataset 120, and the functionality of the perturbation engine 160 is modified accordingly. In other embodiments, the dataset generation application 140 implements neither a fitness metric nor a simulated annealing algorithm. In some alternate embodiments, the dataset generation application 140 implements an optimization algorithm that is not the simulated annealing algorithm.

Anonymizing an Original Dataset

Figure 2A:
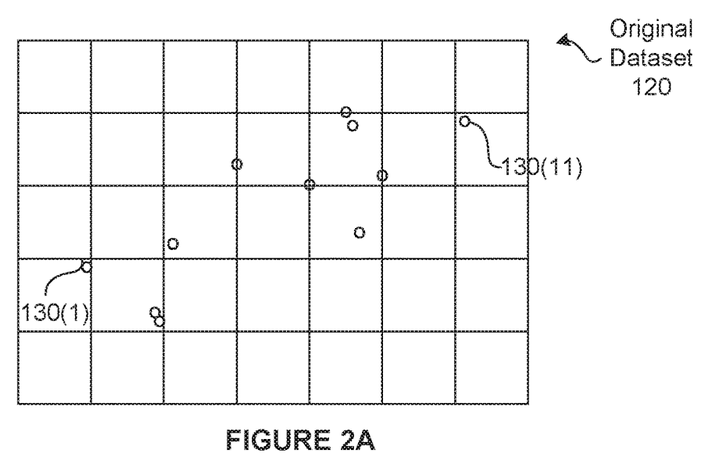
FIG. 2A is an exemplary illustration of the original dataset of FIG. 1, according to various embodiments of the present invention.

FIG. 2A is an exemplary illustration of the original dataset 120 of FIG. 1, according to various embodiments of the present invention. The original dataset 120 includes, without limitation, the eleven data items 130(1)-130(11). Each data item 130 represents a different 2D point and includes, without limitation, a horizontal (x) coordinate and a vertical (y) coordinate. For explanatory purposes the 2D location of each data item 130 included in the original dataset 120 is represented via an unfilled circle.

Figure 2B:
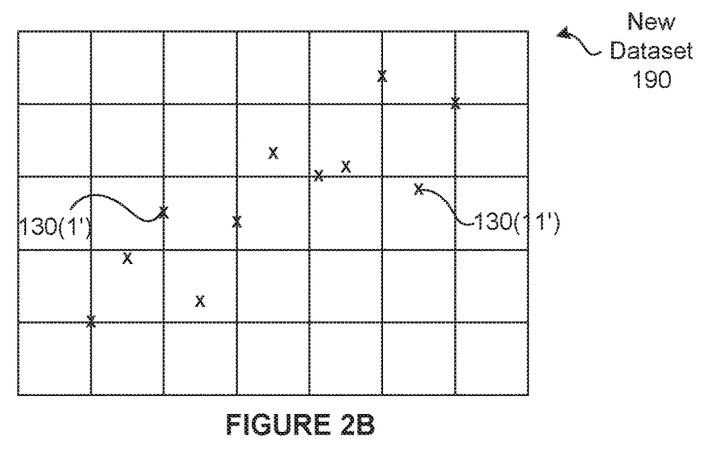
FIG. 2B is an exemplary illustration of the new dataset of FIG. 1 that is generated from the original dataset of FIG. 1 by the dataset generation application of FIG. 1, according to various embodiments of the present invention.

FIG. 2B is an exemplary illustration of the new dataset 190 of FIG. 1 that is generated from the original dataset 120 of FIG. 1 by the dataset generation application 140 of FIG. 1, according to various embodiments of the present invention. The new dataset 190 includes, without limitation, the eleven data items 130(1')-130(11'). For explanatory purposes the 2D location of each data item 130 included in the new dataset 190 is represented via an X. Further, although not shown, the required property value 182 is an overall shape that characterizes the original dataset 120. To determine whether the new dataset 190 is characterized by an overall shape that is substantially similar to the overall shape of the original dataset 120, the consistency engine 180 computes both an x Kolmogorov-Smirnov statistic and a y Kolmogorov-Smirnov statistic.

As persons skilled in the art will recognize, a Kolmogorov-Smirnov statistic indicates a distance between one probability distribution and another probability distribution. To ensure that the overall shape of the new dataset 190 is similar to the overall shape of the original dataset 120, the consistency engine 180 computes an x Kolmogorov-Smirnov statistic based on the original dataset 120 and the test dataset 170. Similarly, the consistency engine 180 computes a y Kolmogorov-Smirnov statistic based on the original dataset 120 and the test dataset 170. If both the x Kolmogorov-Smirnov statistic and the y Kolmogorov-Smirnov are less than 0.05, then the consistency engine 180 sets the new dataset 190 equal to the test dataset 170. Otherwise, the consistency engine 180 discards the test dataset 170.

Figure 2C:
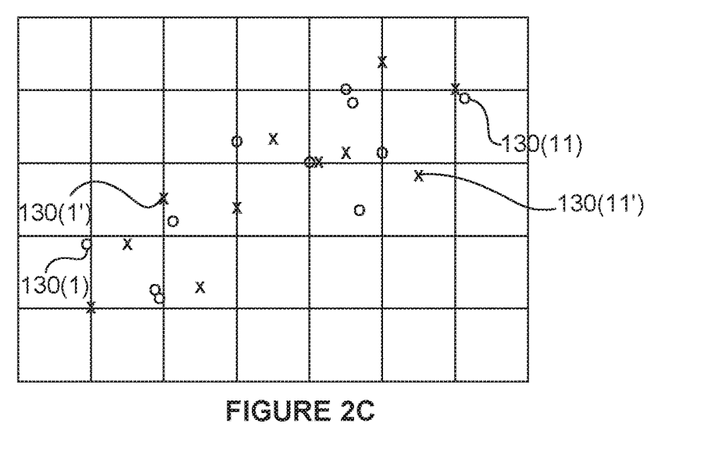
FIG. 2C illustrates a combination of the original dataset of FIG. 2A and the new dataset of FIG. 2B, according to various embodiments of the present invention.

FIG. 2C illustrates a combination of the original dataset 120 of FIG. 2A and the new dataset 190 of FIG. 2B, according to various embodiments of the present invention. For illustrative purposes, the new dataset 190 is shown superimposed on the original dataset 120. The 2D location of each data item 130($i$) included in the original dataset 120 is represented via an unfilled circle. By contrast, the 2D location of each data item 130($i'$) included in the new dataset 190 is represented via an "X." As shown, the overall shape of the new dataset 190 is substantially similar to the overall shape of the original dataset 120. As also shown, there is no overlap in data items 130 between the new dataset 190 and the original dataset 120.

Advantageously, preserving the overall shape of the original dataset 120 allows analysis of related aspects of the original dataset 120 via the new dataset 190. And because none of the data items 130 included in the original dataset 120 are also included in the new dataset 190, analysis of the new dataset 190 does not disclose any confidential data items 130 that are included in the original dataset 120. In general, the dataset generation application 140 may effectively anonymize a wide variety of original datasets 120, such as medical datasets, law enforcement datasets, and the like.

Iteratively Generating a New Dataset Based on a Target Shape

Figure 3:
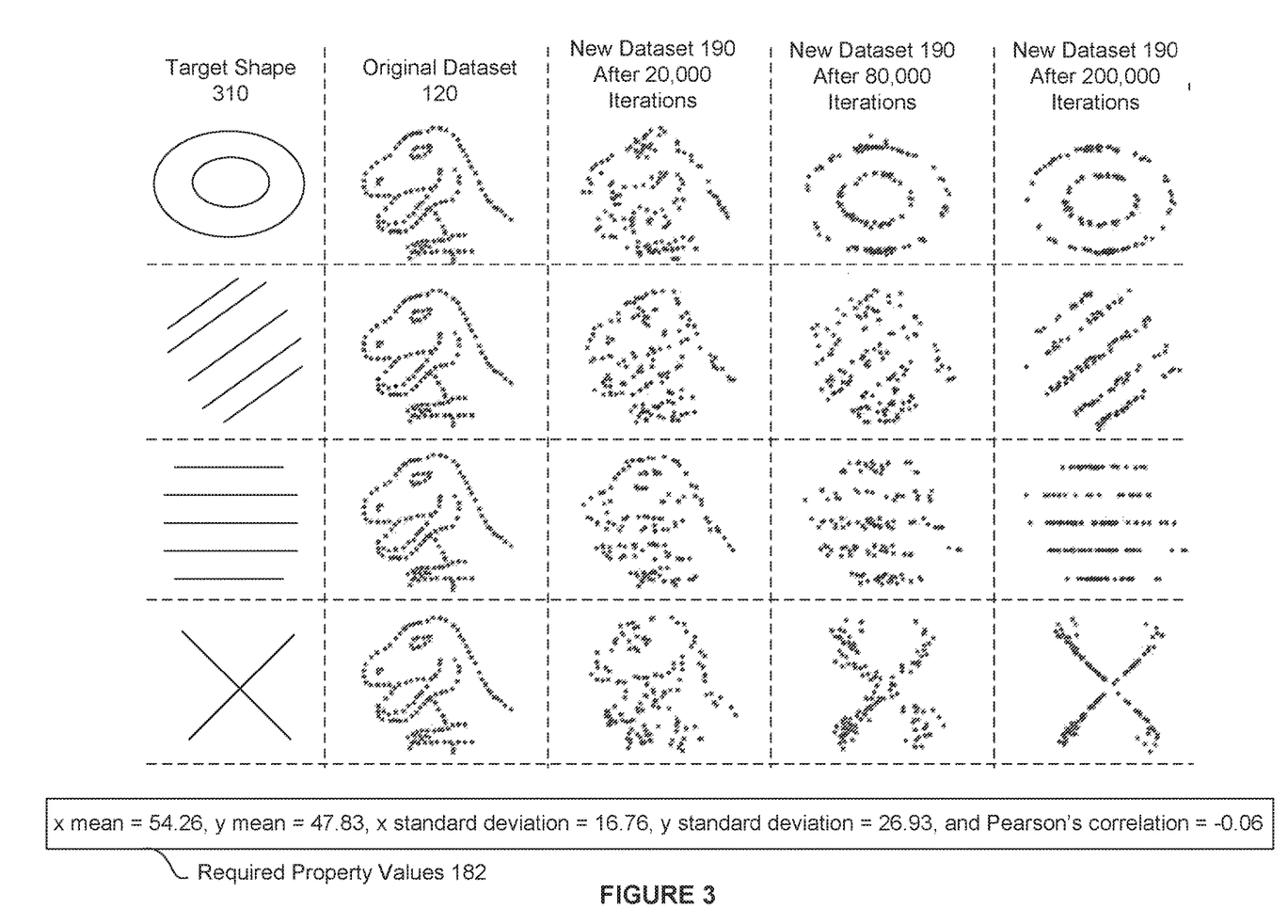
FIG. 3 illustrates a new dataset at three different points in time while being generated from an original dataset, according to various embodiments of the present invention.

FIG. 3 illustrates the new dataset 190 at three different points in time while being generated from the original dataset 120, according to various embodiments of the present invention. As shown, the original dataset 120 is characterized by an overall shape of a dinosaur. To illustrate that datasets may be substantially similar over a number of statistical properties but be characterized by different overall shapes, the required property values 182 are set to statistical values that characterize the original dataset 120. More specifically the required property values 182 include, without limitation, am x mean of 54.26, a y mean of 47.83, an x standard deviation of 16.76, a y standard deviation of 26.93, and a Pearson's correlation of –0.06.

For each of four different target shapes 310, FIG. 3 depicts the evolution of the new dataset 190 at three different points in time during a dataset generation process executed by the dataset generation application 140. The three different points in time are after 20,000 iterations, after 80,000 iterations, and after 200,000 iterations. During the dataset generation process, the dataset generation application 140 coerces the new dataset 190 into the associated target shape 310 via a target shape fitness metric (described previously in conjunction with FIG. 1).

For the target shape 310 of two ovals, after 20,000 iterations, the new dataset 190 resembles neither the dinosaur not the two ovals. After both 80,000 iterations and 200,000 iterations, the new dataset 190 resembles the two ovals. For the target shape 310 of diagonal lines, after 20,000 iterations, the new dataset 190 still resembles the dinosaur. After 80,000 iterations, the new dataset 190 starts to resemble the diagonal lines. After 200,000 iterations, the new dataset 190 resembles the diagonal lines. For the target shape 310 of horizontal lines, after 20,000 iterations, the new dataset 190 still resembles the dinosaur. After 80,000 iterations, the new dataset 190 starts to resemble the horizontal lines. After 200,000 iterations, the new dataset 190 resembles the horizontal lines. For the target shape 310 of an X, after 20,000 iterations, the new dataset 190 slightly resembles the dinosaur. After 80,000 iterations, the new dataset 190 resembles a blurry version of the X. After 200,000 iterations, the new dataset 190 resembles the X.

After 200,000 iterations, the four new datasets 190 associated with the four different target shapes 310 illustrate the importance of visualizing data. More specifically, the new datasets 190 demonstrate that two datasets having similar statistics are not necessarily similar in other aspects. In particular, the data items 130 included in the two datasets may vary dramatically. In alternate embodiments, the dataset generation application 140 may be configured to coerce the shape of any type of graph associated with the new dataset 190 toward a target shape via the target shape fitness criterion.

Figure 4A:
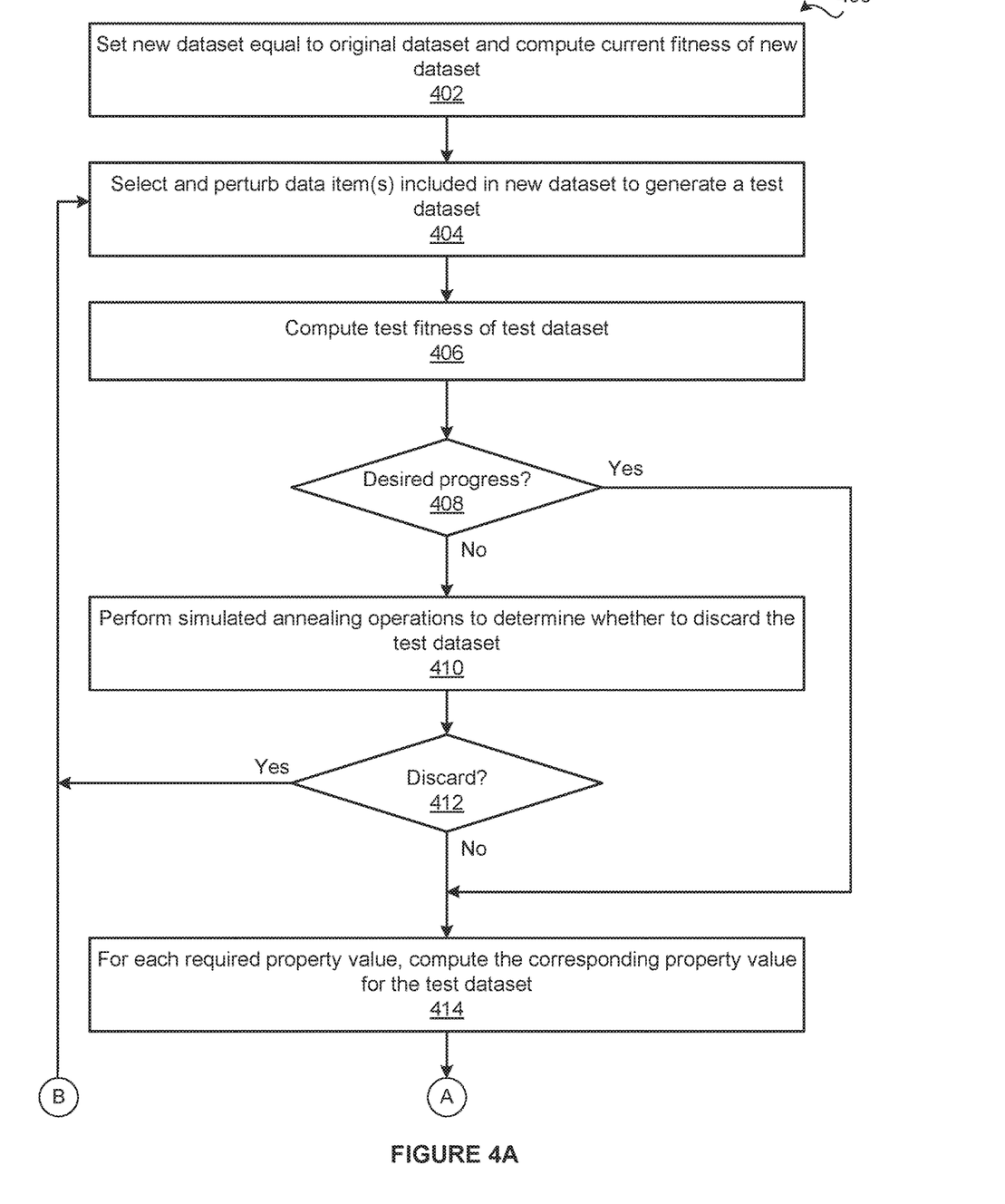
FIGS. 4A-4B set forth a flow diagram of method steps for generating a new dataset from an original dataset, according to various embodiments of the present invention.
Figure 4B:
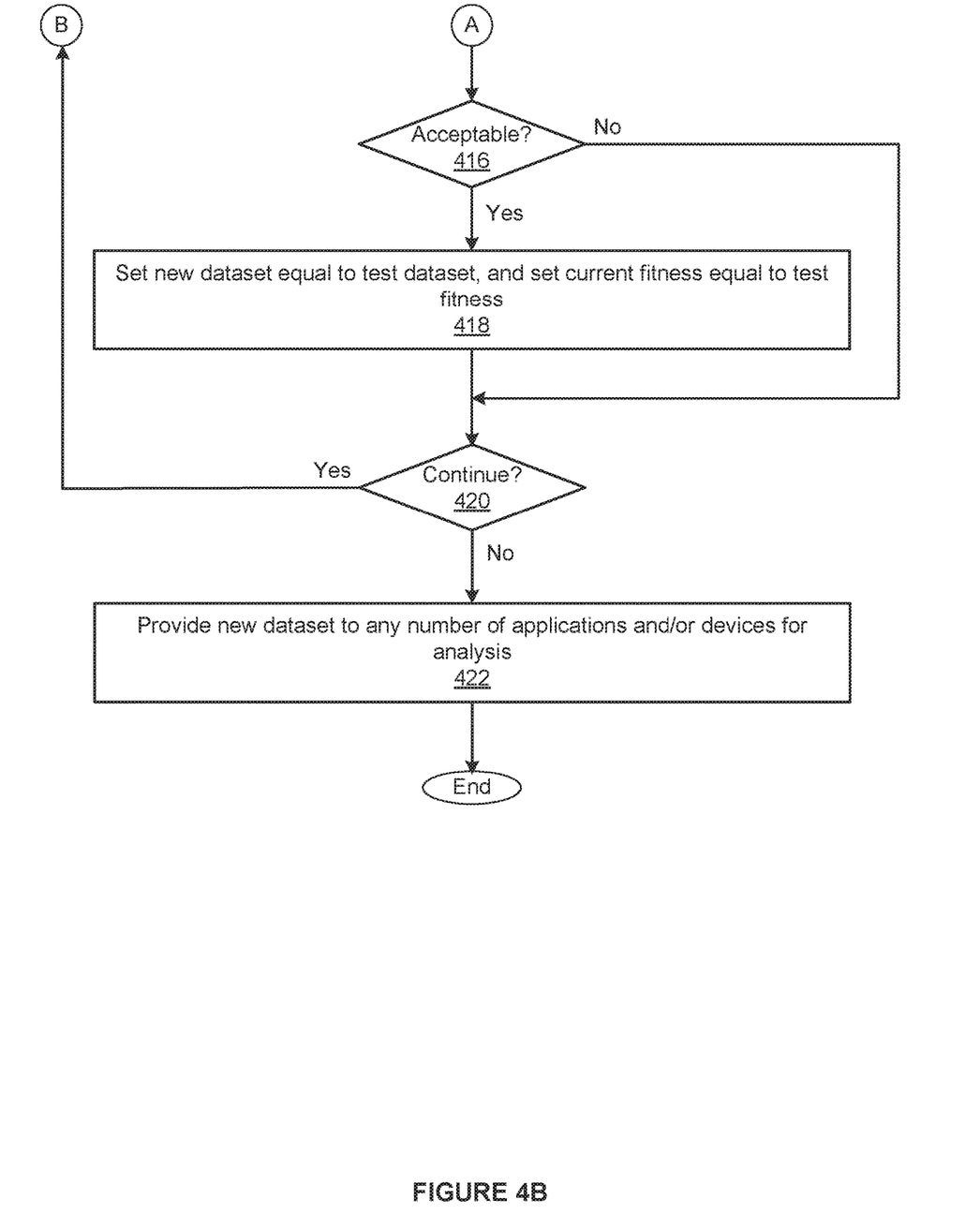

FIGS. 4A-4B set forth a flow diagram of method steps for generating a new dataset from an original dataset, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the iteration controller 150 sets the new dataset 190 equal to the original dataset 120 and then computes the current fitness value 162 based on the new dataset 190. At step 404, the perturbation engine 160 selects and perturbs any number of data items 130 included in the original dataset 120 to generate corresponding new data items 130. The perturbation engine 160 includes the new data items 130 in the test dataset 170, but does not include the selected data items 130 in the test dataset 170.

At step 406, the perturbation engine 160 computes the test fitness 164 based on the test dataset 170. At step 408, the perturbation engine 160 determines whether the test dataset 170 represents progress toward a desired goal associated with the fitness metric based on the test fitness 164 and the current fitness 162. If, at step 408, the perturbation engine 160 determines that the test dataset 170 does not represent progress toward the desired goal, then the method 400 proceeds to step 410.

At step 410, the perturbation engine 160 performs one or more simulated annealing operations to determine whether to discard the test dataset 170. At step 412, the perturbation engine 160 determines whether to discard the test dataset 170 or to further evaluate the test dataset 170. If, at step 412, the perturbation engine 160 determines to discard the test dataset 170, then the method 400 returns to step 404, where the perturbation engine 160 generates a new test dataset 170.

If, however, at step 412, the perturbation engine 160 determines to further evaluate the test dataset 170, then the method 400 proceeds to step 414. Returning now to step 408, if the perturbation engine 160 determines that the test dataset 170 represents progress toward the desired goal, then the method 400 proceeds directly to step 414.

At step 414, for each required property value 182, the consistency engine computes the corresponding property value for the test dataset 170. At step 416, the consistency engine 180 determines whether the test dataset 170 is acceptable based on the test property values and the required property values 182. More specifically, the consistency engine 180 determines whether the test dataset 170 is characterized by property values that are substantially similar to the required property values 182. If, at step 416, the consistency engine 180 determines that the test dataset 170 is acceptable, then the method 400 proceeds to step 418. At step 418, the consistency engine 130 sets the new dataset 190 equal to the test dataset 170 and sets the current fitness 162 equal to the test fitness 164.

If, however, at step 416, the consistency engine 130 determines that the test dataset 170 is not acceptable, then the method 400 proceeds directly to step 420. At step 420, the iteration engine 150 determines whether to continue iterating based on the completion criterion 152. If at step 422, the iteration engine 150 determines to continue iterating, then the method 400 returns to step 404, where the perturbation engine 160 generates a new test dataset 170.

If, however, at step 422, the iteration engine 150 determines to cease iterating, then the method 400 proceeds to step 424. At step 424, the iteration engine 150 transmits the new dataset 170 to any number of software applications and/or devices (e.g., a display device) for analysis. In this fashion, the new dataset 190 conveys aspect(s) of the original dataset 120 without revealing confidential data items 130 included in the original dataset 120. The method 400 then terminates.

In sum, the disclosed techniques may be used to efficiently generate a new dataset that is characterized by one or more properties values that are substantially similar to property values that characterize an original dataset. A dataset generation application includes, without limitation, an iteration controller, a perturbation engine, and a consistency engine. Upon receiving the original dataset, the iteration controller sets a new dataset equal to the original dataset. The iteration controller then computes a current fitness based on the new dataset, and sets an iteration count to one. Subsequently, the perturbation engine executes a dataset perturbation process.

During the dataset perturbation process, the perturbation engine randomly selects one or more data items included in the new dataset. For each of the selected data items, the perturbation engine adjusts the data item by a relatively small amount in a random manner to generate a new data item. The perturbation engine then generates a test dataset that includes the new data items instead of the selected data items. Subsequently, the perturbation engine computes a test fitness based on the test dataset. If the test fitness is less than the current fitness and a temperature associated with a simulated annealing algorithm is less than a randomly generated number, then the perturbation engine discards the test dataset and repeats the dataset perturbation process. Otherwise, the perturbation engine transmits the test dataset to the consistency engine.

The consistency engine determines whether the test dataset is characterized by property values that are substantially similar to the required property values. If the consistency engine determines that the test dataset is characterized by property values that are substantially similar to the required property values, then the consistency engine sets the new dataset equal to the test dataset, and the current fitness equal to the test fitness. Otherwise, the consistency engine discards the test dataset. Subsequently, the iteration controller increments the iteration count and determines whether the iteration count exceeds a maximum number of iterations. If the iteration count does not exceed the maximum number of iterations, then the iteration controller configures the perturbation engine to re-execute the dataset perturbation process. to generate a new test dataset. Otherwise, the iteration controller transmits the new dataset to any number of software applications or devices. The new dataset enables analysis of aspects of the original dataset that are associated with the required property values without disclosing the original dataset.

At least one technical advantage of the dataset generation application relative to prior art is that the dataset generation application iteratively generates new data items included in a new dataset instead of masking specific types of data items included in an original dataset. More specifically, the dataset generation application can be used to incrementally replace individual non-confidential data items and individual confidential data items, where the new confidential data items cannot be effectively reconstructed from the new non-confidential data items. Notably, because the dataset generation application ensures that the new dataset is characterized by property values that are substantially similar to the required property values, the new dataset accurately emulates the original dataset with respect to the required property values. Accordingly, the dataset generation application can be used to anonymize a wide variety of datasets that could not be effectively anonymized using prior art approaches. For instance, the dataset generation application can anonymize design files, model geometries, etc. These technical advantages provide a substantial technological advancement over prior art solutions.

1. In some embodiments, a computer-implemented method for generating a new dataset based on an original dataset comprises perturbing a first data item included in the original dataset to generate a second data item; generating a test dataset based on the original dataset and the second data item, wherein the test dataset includes the second data item instead of the first data item; determining, via a processor, that the test dataset is characterized by a first property value that is substantially similar to a second property value that characterizes the original dataset, wherein both the first property value and the second property value are associated with a first property; and generating the new dataset based on the test dataset, wherein the new dataset conveys at least one aspect of the original dataset that is associated with the first property without revealing the first data item.

2. The computer-implemented method of clause 1, wherein generating the test dataset comprises replacing the first data item included in the original dataset with the second data item to generate a potential dataset; computing a first average distance between the potential dataset and a target shape; computing a second average distance between the original dataset and the target shape; determining that the first average distance is less than the second average distance; and setting the test dataset equal to the potential dataset.

3. The computer-implemented method of clauses 1 or 2, wherein generating the test dataset comprises performing one or more simulated annealing operations that indicate that the second data item is to be included in the test dataset; and replacing the first data item included in the original dataset with the second data item to generate the test dataset.

4. The computer-implemented method of any of clauses 1-3, wherein perturbing the first data item comprises randomly selecting the first data item from a plurality of data items included in the original dataset; and modifying the first data item based on a randomly generated value.

5. The computer-implemented method of any of clauses 1-4, further comprising, prior to perturbing the first data item, perturbing a third data item included in the original dataset to generate a fourth data item; generating an initial test dataset based on the original dataset and the fourth data item, wherein the initial test dataset includes the fourth data item instead of the third data item; determining that a third property value associated with both the first property and the initial test dataset is not substantially similar to the second property value; and discarding the initial test dataset.

6. The computer-implemented method of any of clauses 1-5, wherein generating the test dataset comprises replacing the first data item included in the original dataset with the second data item to generate a modified test dataset; determining that the modified test dataset is characterized by a third property value that is associated with the first property and is substantially similar to the second property value; perturbing a third data item included in the modified test dataset to generate a fourth data item; and replacing the third data item included in the modified test dataset with the fourth data item to generate the test dataset.

7. The computer-implemented method of any of clauses 1-6, wherein generating the new dataset comprises performing a plurality of replacement operations on the test dataset to generate a modified test dataset, wherein each replacement operation replaces a given data item included in the test dataset with a new data item that is generated based on the given data item; determining that the modified test dataset is characterized by a third property value that is associated with the first property and is substantially similar to the second property value; and setting the new dataset equal to the modified test dataset.

8. The computer-implemented method of any of clauses 1-7, wherein the original dataset comprises a mufti-dimensional dataset.

9. The computer-implemented method of any of clauses 1-8, wherein the original dataset comprises a design file or model geometry.

10. The computer-implemented method of any of clauses 1-9, wherein the first property comprises a mathematical property, a statistical property, a visual property, a physical property, or a result of an application-specific action.

11. In some embodiments, a computer-readable storage medium includes instructions that, when executed by a processor, cause the processor to generate a new dataset based on an original dataset by performing the steps of perturbing a first data item included in the original dataset to generate a second data item; generating a test dataset based on the original dataset and the second data item, wherein the test dataset includes the second data item instead of the first data item; determining, via a processor, that the test dataset is characterized by a first property value that is substantially similar to a second property value that characterizes the original dataset, wherein both the first property value and the second property value are associated with a first property; and generating the new dataset based on the test dataset, wherein the new dataset conveys at least one aspect of the original dataset that is associated with the first property without revealing the first data item.

12. The computer-readable storage medium of clause 11, wherein generating the test dataset comprises replacing the first data item included in the original dataset with the second data item to generate a potential dataset; computing a first average distance between the potential dataset and a target shape; computing a second average distance between the original dataset and the target shape; determining that the first average distance is less than the second average distance; and setting the test dataset equal to the potential dataset.

13. The computer-readable storage medium of clauses 11 or 12, wherein generating the test dataset comprises performing one or more simulated annealing operations that indicate that the second data item is to be included in the test dataset; and replacing the first data item included in the original dataset with the second data item to generate the test dataset.

14. The computer-readable storage medium of any of clauses 11-13, wherein perturbing the first data item comprises randomly selecting the first data item from a plurality of data items included in the original dataset; and modifying the first data item based on a randomly generated value.

15. The computer-readable storage medium of any of clauses 11-14, further comprising, prior to perturbing the first data item, perturbing a third data item included in the original dataset to generate a fourth data item; generating an initial test dataset based on the original dataset and the fourth data item, wherein the initial test dataset includes the fourth data item instead of the third data item; determining that a third property value associated with both the first property and the initial test dataset is not substantially similar to the second property value; and discarding the initial test dataset.

16. The computer-readable storage medium of any of clauses 11-15, wherein generating the new dataset comprises perturbing the second data item included in the test dataset to generate a third data item; generating a modified test dataset based on the test dataset and the third data item, wherein the modified test dataset includes the third data item instead of the second data item; determining that the modified test dataset is characterized by a third property value that is associated with the first property and is substantially similar to the second property value; and setting the new dataset equal to the modified test dataset.

17. The computer-readable storage medium of any of clauses 11-16, wherein generating the new dataset comprises performing a plurality of replacement operations on the test dataset to generate a modified test dataset, wherein each replacement operation replaces a given data item included in the test dataset with a new data item that is generated based on the given data item; determining that the modified test dataset is characterized by a third property value that is associated with the first property and is substantially similar to the second property value; determining that the modified test dataset satisfies one or more completion criteria; and setting the new dataset equal to the modified test dataset.

18. The computer-readable storage medium of any of clauses 11-17, wherein the first data item comprises a hierarchical data item.

19. The computer-readable storage medium of any of clauses 11-18, wherein the first property comprises a mathematical property, a statistical property, a visual property, a physical property, or a result of an application-specific action.

20. In some embodiments, a system comprises a memory storing instructions; and a processor that is coupled to the memory and, when executing the instructions, is configured to perturb a first data item included in the original dataset to generate a second data item; generate a test dataset based on the original dataset and the second data item, wherein the test dataset includes the second data item instead of the first data item; determine that the test dataset is characterized by a first property value that is substantially similar to a second property value that characterizes the original dataset, wherein both the first property value and the second property value are associated with a first property; and generate the new dataset based on the test dataset, wherein the new dataset conveys at least one aspect of the original dataset that is associated with the first property without revealing the first data item.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a new dataset based on an original dataset, the method comprising:
    perturbing a first data item included in the original dataset to generate a second data item;
    generating a test dataset based on the original dataset and the second data item, wherein the test dataset includes the second data item instead of the first data item;
    comparing, via a processor, the test dataset and the original dataset to determine that the test dataset is characterized by a first property value that is substantially similar to a second property value that characterizes the original dataset, wherein both the first property value and the second property value are associated with a first property; and
    generating the new dataset based on the test dataset, wherein the new dataset conveys at least one aspect of the original dataset that is associated with the first property without revealing the first data item.

2. The computer-implemented method of claim 1, wherein generating the test dataset comprises:
    replacing the first data item included in the original dataset with the second data item to generate a potential dataset;
    computing a first average distance between the potential dataset and a target shape;
    computing a second average distance between the original dataset and the target shape;
    determining that the first average distance is less than the second average distance; and
    setting the test dataset equal to the potential dataset.

3. The computer-implemented method of claim 1, wherein generating the test dataset comprises:
    performing one or more simulated annealing operations that indicate that the second data item is to be included in the test dataset; and
    replacing the first data item included in the original dataset with the second data item to generate the test dataset.

4. The computer-implemented method of claim 1, wherein perturbing the first data item comprises:
    randomly selecting the first data item from a plurality of data items included in the original dataset; and
    modifying the first data item based on a randomly generated value.

5. The computer-implemented method of claim 1, further comprising, prior to perturbing the first data item:
    perturbing a third data item included in the original dataset to generate a fourth data item;
    generating an initial test dataset based on the original dataset and the fourth data item, wherein the initial test dataset includes the fourth data item instead of the third data item;
    determining that a third property value associated with both the first property and the initial test dataset is not substantially similar to the second property value; and
    discarding the initial test dataset.

6. The computer-implemented method of claim 1, wherein generating the test dataset comprises:
    replacing the first data item included in the original dataset with the second data item to generate a modified test dataset;
    determining that the modified test dataset is characterized by a third property value that is associated with the first property and is substantially similar to the second property value;
    perturbing a third data item included in the modified test dataset to generate a fourth data item; and
    replacing the third data item included in the modified test dataset with the fourth data item to generate the test dataset.

7. The computer-implemented method of claim 1, wherein generating the new dataset comprises:
    performing a plurality of replacement operations on the test dataset to generate a modified test dataset, wherein each replacement operation replaces a given data item included in the test dataset with a new data item that is generated based on the given data item;
    determining that the modified test dataset is characterized by a third property value that is associated with the first property and is substantially similar to the second property value; and
    setting the new dataset equal to the modified test dataset.

8. The computer-implemented method of claim 1, wherein the original dataset comprises a multi-dimensional dataset.

9. The computer-implemented method of claim 1, wherein the original dataset comprises a design file or model geometry.

10. The computer-implemented method of claim 1, wherein the first property comprises a mathematical property, a statistical property, a visual property, a physical property, or a result of an application-specific action.

11. A computer-readable storage medium including instructions that, when executed by a processor, cause the processor to generate a new dataset based on an original dataset by performing the steps of:

perturbing a first data item included in the original dataset to generate a second data item;

generating a test dataset based on the original dataset and the second data item, wherein the test dataset includes the second data item instead of the first data item;

comparing, via a processor, the test dataset and the original dataset to determine that the test dataset is characterized by a first property value that is substantially similar to a second property value that characterizes the original dataset, wherein both the first property value and the second property value are associated with a first property; and generating the new dataset based on the test dataset, wherein the new dataset conveys at least one aspect of the original dataset that is associated with the first property without revealing the first data item.

12. The computer-readable storage medium of claim 11, wherein generating the test dataset comprises:

replacing the first data item included in the original dataset with the second data item to generate a potential dataset;

computing a first average distance between the potential dataset and a target shape;

computing a second average distance between the original dataset and the target shape;

determining that the first average distance is less than the second average distance; and setting the test dataset equal to the potential dataset.

13. The computer-readable storage medium of claim 11, wherein generating the test dataset comprises:

performing one or more simulated annealing operations that indicate that the second data item is to be included in the test dataset; and replacing the first data item included in the original dataset with the second data item to generate the test dataset.

14. The computer-readable storage medium of claim 11, wherein perturbing the first data item comprises:

randomly selecting the first data item from a plurality of data items included in the original dataset; and modifying the first data item based on a randomly generated value.

15. The computer-readable storage medium of claim 11, further comprising, prior to perturbing the first data item:

perturbing a third data item included in the original dataset to generate a fourth data item;

generating an initial test dataset based on the original dataset and the fourth data item, wherein the initial test dataset includes the fourth data item instead of the third data item;

determining that a third property value associated with both the first property and the initial test dataset is not substantially similar to the second property value; and discarding the initial test dataset.

16. The computer-readable storage medium of claim 11, wherein generating the new dataset comprises:

perturbing the second data item included in the test dataset to generate a third data item;

generating a modified test dataset based on the test dataset and the third data item, wherein the modified test dataset includes the third data item instead of the second data item;

determining that the modified test dataset is characterized by a third property value that is associated with the first property and is substantially similar to the second property value; and setting the new dataset equal to the modified test dataset.

17. The computer-readable storage medium of claim 11, wherein generating the new dataset comprises:

performing a plurality of replacement operations on the test dataset to generate a modified test dataset, wherein each replacement operation replaces a given data item included in the test dataset with a new data item that is generated based on the given data item;

determining that the modified test dataset is characterized by a third property value that is associated with the first property and is substantially similar to the second property value;

determining that the modified test dataset satisfies one or more completion criteria; and setting the new dataset equal to the modified test dataset.

18. The computer-readable storage medium of claim 11, wherein the first data item comprises a hierarchical data item.

19. The computer-readable storage medium of claim 11, wherein the first property comprises a mathematical property, a statistical property, a visual property, a physical property, or a result of an application-specific action.

20. A system, comprising:

a memory storing instructions; and a processor that is coupled to the memory and, when executing the instructions, is configured to:

perturb a first data item included in the original dataset to generate a second data item;

generate a test dataset based on the original dataset and the second data item, wherein the test dataset includes the second data item instead of the first data item;

compare the test dataset and the original dataset to determine that the test dataset is characterized by a first property value that is substantially similar to a second property value that characterizes the original dataset, wherein both the first property value and the second property value are associated with a first property; and generate the new dataset based on the test dataset, wherein the new dataset conveys at least one aspect of the original dataset that is associated with the first property without revealing the first data item.

* * * * *